United States Patent
Han et al.

(10) Patent No.: US 9,563,277 B2
(45) Date of Patent: Feb. 7, 2017

(54) APPARATUS, SYSTEM, AND METHOD FOR CONTROLLING VIRTUAL OBJECT

(75) Inventors: Seung Ju Han, Seoul (KR); Jae Joon Han, Seoul (KR); Du Sik Park, Suwon-si (KR); Chang Kyu Choi, Seongnam-si (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 13/421,262

(22) Filed: Mar. 15, 2012

(65) Prior Publication Data

US 2012/0235899 A1 Sep. 20, 2012

(30) Foreign Application Priority Data

Mar. 16, 2011 (KR) .......................... 10-2011-0023551

(51) Int. Cl.
*G06F 3/033* (2013.01)
*G06F 3/01* (2006.01)
*G06K 9/00* (2006.01)

(52) U.S. Cl.
CPC ........... *G06F 3/017* (2013.01); *G06K 9/00355* (2013.01)

(58) Field of Classification Search
None
See application file for complete search history.

(56) References Cited

U.S. PATENT DOCUMENTS

| 2004/0237103 A1* | 11/2004 | Kondo | H04N 5/21 725/37 |
| 2009/0231278 A1* | 9/2009 | St. Hilaire | G06F 3/017 345/158 |
| 2010/0199230 A1 | 8/2010 | Latta et al. | |
| 2010/0268745 A1 | 10/2010 | Choi et al. | |
| 2010/0302357 A1 | 12/2010 | Hsu et al. | |
| 2011/0205341 A1* | 8/2011 | Wilson | H04N 13/0275 348/51 |
| 2011/0317871 A1* | 12/2011 | Tossell | G06K 9/00369 382/103 |
| 2012/0157203 A1* | 6/2012 | Latta | G06F 3/005 463/32 |

FOREIGN PATENT DOCUMENTS

| KR | 10-2003-0037692 | 5/2003 |
| KR | 10-2006-0070280 | 6/2006 |
| KR | 10-2006-0101071 | 9/2006 |
| KR | 10-2007-0116794 | 12/2007 |
| KR | 10-2008-0065032 | 7/2008 |
| KR | 10-2010-0047793 | 5/2010 |
| KR | 10-2010-0055945 | 5/2010 |
| KR | 10-2010-0088042 | 8/2010 |
| KR | 10-2010-0113995 | 10/2010 |
| KR | 10-2010-0121420 | 11/2010 |
| KR | 10-2010-0125703 | 12/2010 |
| KR | 10-2010-0131213 | 12/2010 |
| KR | 10-2011-0022057 | 3/2011 |

* cited by examiner

*Primary Examiner* — Joseph Haley
*Assistant Examiner* — Ifedayo Iluyomade
(74) *Attorney, Agent, or Firm* — NSIP Law

(57) ABSTRACT

An apparatus, system, and method for controlling a virtual object. The virtual object is controlled by detecting a hand motion of a user and generating an event corresponding to the hand motion. Accordingly, the user may control the virtual object displayed on a 3-dimensional graphic user interface (3D GUI) more intuitively and efficiently.

16 Claims, 8 Drawing Sheets

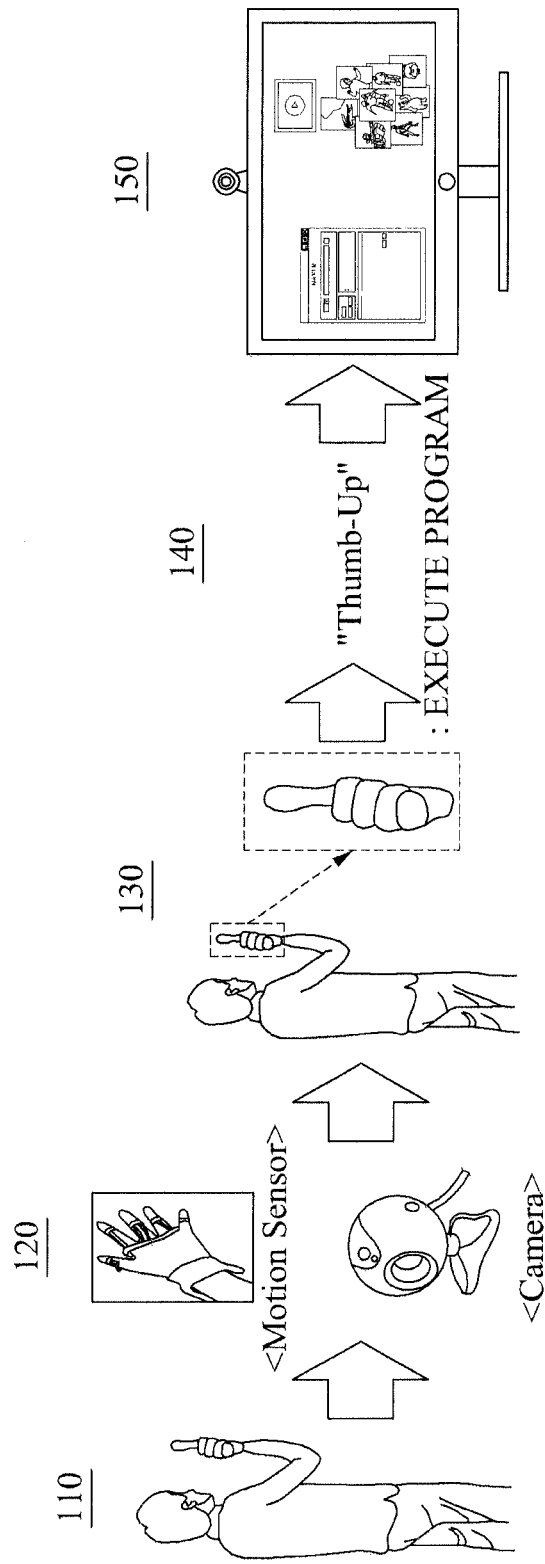

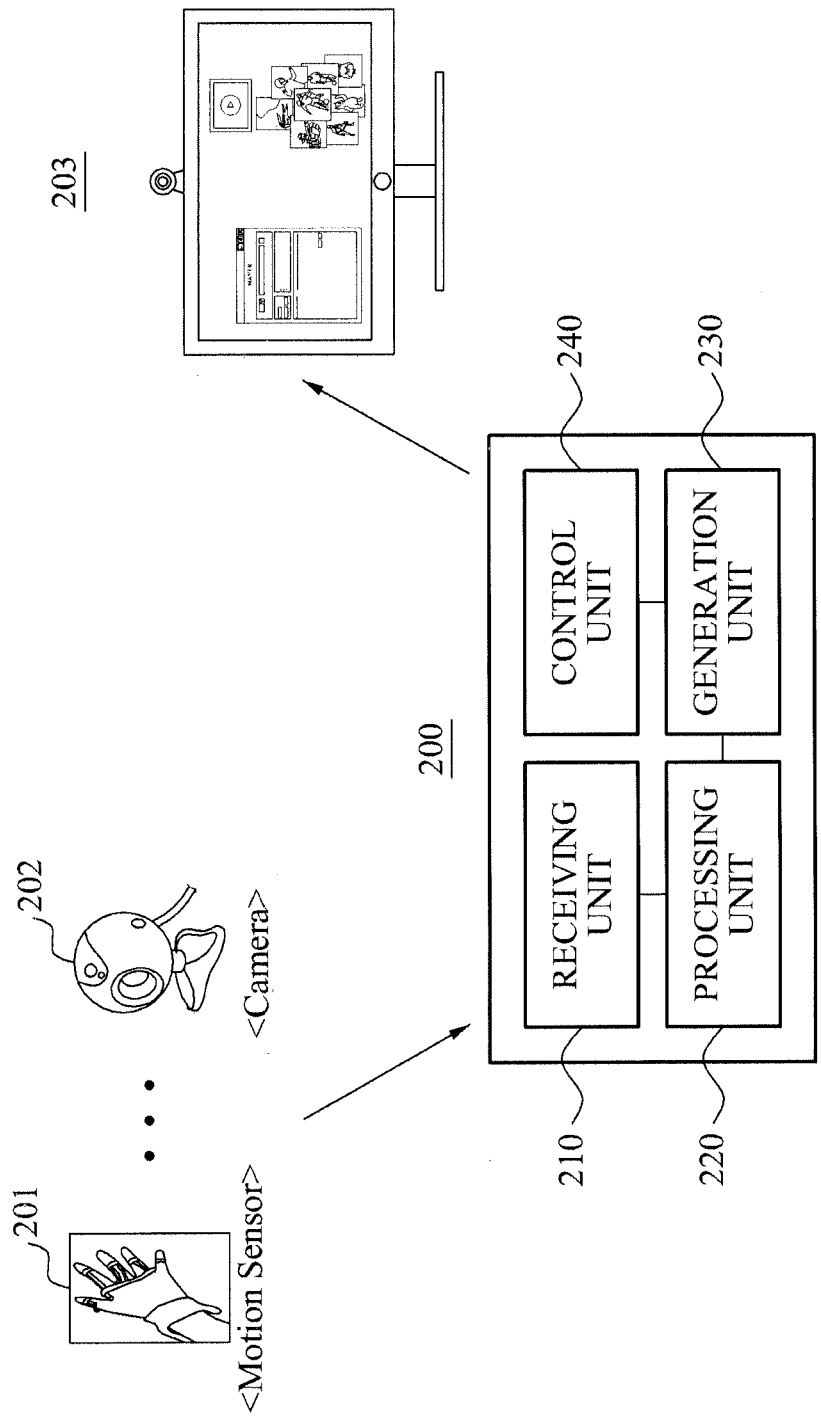

FIG. 3A
| Hand Posture | Description | Embodiments of virtual object operation/ program control method |
|---|---|---|
| Open palm |  | Start / cancel selection |
| Fist |  | Stop, select |
| Pointing |  | Point |
| Thumb-up | 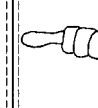 | Execute |
| Thumb-down | 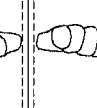 | Cancel |
| Grab |  | Execute, scroll |

FIG. 4

| | Hand Gesture | Description | Embodiments of virtual object operation/program control method | |
|---|---|---|---|---|
| 401 | Push | Push hand forward | Zoom in, Select | 402 |
| 411 | Pull | Pull hand toward body | Zoom out, Escape | 412 |
| 421 | Slap left | Move hand from right to left | Horizontal Scroll | 422 |
| 431 | Slap right | Move hand from left to right | Horizontal Scroll | 432 |
| 441 | Slap top | Move hand from bottom to top | Vertical Scroll | 442 |
| 451 | Slap bottom | Move hand from top to bottom | Vertical Scroll | 452 |
| 461 | Circle clockwise | Make circle by hand clockwise | Increase | 462 |
| 471 | Circle anti-clockwise | Make circle by hand anti-clockwise | Decrease | 472 |
| 481 | Waving | Wave hand right and left | Wake-up, Context menu | 482 |
| 491 | Check | Make v shape by hand | Ok | 492 |

APPARATUS, SYSTEM, AND METHOD FOR CONTROLLING VIRTUAL OBJECT

CROSS-REFERENCE TO RELATED APPLICATIONS

This application claims the priority benefit of Korean Patent Application No. 10-2011-0023551, filed on Mar. 16, 2011, in the Korean Intellectual Property Office, the disclosure of which is incorporated herein by reference.

BACKGROUND

1. Field

Example embodiments of the following description relate to an apparatus and method for controlling a virtual object, and more particularly, to an apparatus and method for controlling a virtual object corresponding to motions of a user.

2. Description of the Related Art

In recent times, the number of intuitive interfaces improved in natural interaction between a human and a computer is increasing. Research is being actively performed with respect to recognition of user intention and motion for the interaction between the human and the computer. Additionally, interactive display fields, and the like, are developing rapidly, providing a more natural computing environment replacing typical user interfaces, such as, a keyboard and a mouse.

In the following description, a 3-dimensional (3D) user interface (UI) capable of providing improved immersion and unity and a new apparatus and method for controlling the 3D UI will be suggested.

SUMMARY

The foregoing and/or other aspects are achieved by providing a virtual object control apparatus including a receiving unit to receive detection information related to a user from a sensor, a processing unit to extract hand motion information related to hand motions of the user from the received detection information, a generation unit to generate an event corresponding to the extracted hand motion information, and a control unit to control a virtual object displayed on a 3-dimensional graphic user interface (3D GUI) based on the generated event.

The foregoing and/or other aspects are also achieved by providing a virtual object control method including receiving detection information related to motions of a user from a sensor, extracting hand motion information related to hand motions of the user from the received detection information, generating an event corresponding to the extracted hand motion information, and controlling a virtual object displayed on a 3D GUI based on the generated event.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 1 illustrates an operation of a virtual object control apparatus detecting a motion of a user and accordingly controlling a virtual object, according to example embodiments;

FIG. 2 illustrates a structure of a virtual object control apparatus, according to example embodiments;

FIG. 3A illustrates a posture event, according to example embodiments;

FIG. 4 illustrates a gesture event, according to example embodiments;

DETAILED DESCRIPTION

Figure 3B:
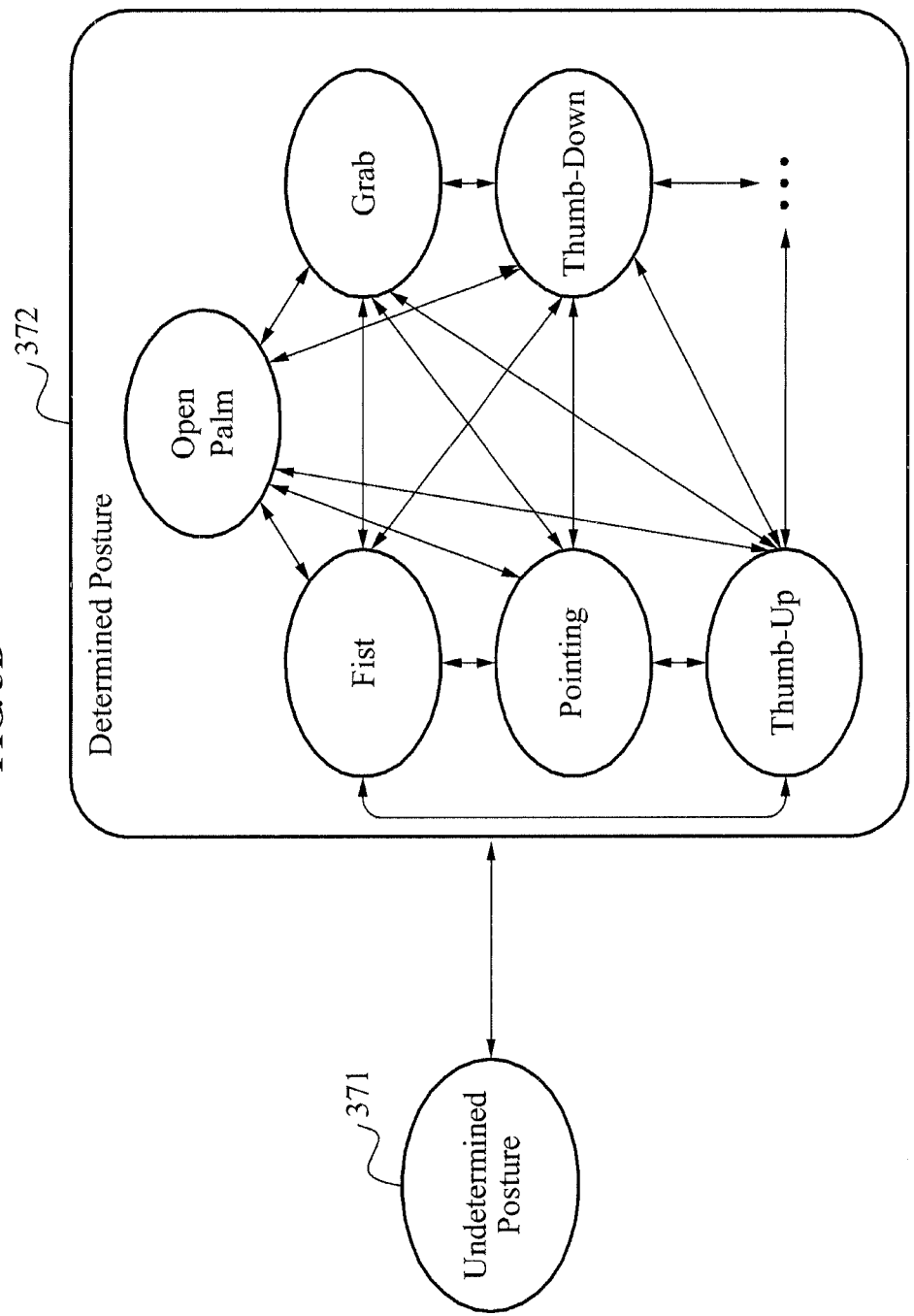
FIG. 3B illustrates flows of state change of a posture event related to a hand posture, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates an operation of a virtual object control apparatus detecting a motion of a user, and accordingly, controlling a virtual object, according to example embodiments.

Referring to FIG. 1, in operation 110, a user may make a hand motion for controlling a virtual object in front of a sensor, so as to control the virtual object displayed on a 3-dimensional graphic user interface (3D GUI). For example, the user may make a thumb-up posture in which a thumb is raised from a fist.

In this state, a sensor may detect the motion of the user in operation 120. The sensor may be a motion sensor, a camera, and the like. For example, the camera may detect the motion of the user by photographing the user making the thumb-up posture.

The sensor may transmit detection information related to the motion of the user to the virtual object control apparatus. Receiving the detection information, the virtual object control apparatus may extract hand motion information related to the hand motion of the user from the received detection information in operation 130.

For example, when receiving the detection information related to the user photographed by the camera, the virtual object control apparatus may recognize from the detection information that the hand of the user is in the thumb-up posture.

When the hand motion information is extracted, the virtual object control apparatus may generate an event corresponding to the extracted hand motion information in operation 140. For example, when the event corresponding to the thumb-up posture, i.e., the hand motion of the user, is an event for running the virtual object, the virtual object control apparatus may generate an event related to the thumb-up posture and an operation of running the virtual object.

When the event corresponding to the hand motion information is generated, the virtual object control apparatus may control the virtual object displayed on the 3D GUI based on the event in operation 150. For example, the virtual object control apparatus may execute a program related to the virtual object in accordance with the event corresponding to the thumb-up posture.

Hereinafter, a structure of a virtual object control apparatus according to example embodiments will be described in detail.

FIG. 2 illustrates a structure of a virtual object control apparatus 200, according to example embodiments.

Referring to FIG. 2, the virtual object control apparatus 200 includes a receiving unit 210, a processing unit 220, a generation unit 230, and a control unit 240.

The receiving unit 210 may receive detection information related to a user from sensors 201 and 202.

The sensors 201 and 202 according to example embodiments may include a motion sensor 201, a camera 202, a bend sensor (not illustrated), and the like.

The processing unit 220 may extract hand motion information related to a hand motion of the user from the received detection information. More specifically, the processing unit 220 may recognize a posture or a gesture of the hand of the user, using the detection information, and extract the hand motion information related to the hand motion of the user from the detection information.

The generation unit 230 may generate an event corresponding to the extracted hand motion information. According to example embodiments, the generation unit 230 may generate a posture event and motion event of the hand by processing the hand motion information based on confidence, velocity and acceleration, and the like, so as to minimize an error regarding extracted information on the hand posture and motion.

The control unit 240 may control the virtual object displayed on the 3D GUI, based on the generated event.

According to an aspect, the virtual object may be described by at least one scene representation selected from binary format for scenes (BIFS), light application scene representation (LASeR), and Widget.

According to an aspect, the virtual object control apparatus 200 may further include an output unit 203. The output unit 203 may output the virtual object to a display device.

According to an aspect, the event may include a posture event related to a hand posture of the user and a gesture event related to a hand gesture of the user. That is, the generation unit 230 may distinguish the hand posture and the hand gesture from each other in accordance with the hand motion information, and thereby generate the posture event or the gesture event.

Hereinafter, the posture event and the gesture event, according to example embodiments, will be described in detail.

The posture event may include elements of a user identifier (ID), a left hand posture (LH_Posture), a left hand position (LH_Position), a right hand posture (RH_Posture), and a right hand position (RH_Position).

Table 1 shows syntax of the posture event, according to example embodiments.

TABLE 1

```
<!-- ################################################## -->
<!-- Hand Posture Information                         -->
<!-- ################################################## -->
<complexType name="HandPostureType">
  <sequence>
    <element name="UserID" type="aui:UserIDType"
      minOccurs="0"/>
```

TABLE 1-continued

```
    <element name="LH_Posture" type="auict:HandPostureType"
      minOccurs="0"/>
    <element name="LH_Position" type="aui:PositionType"
      minOccurs="0"/>
    <element name="RH_Posture" type="auict:HandPosureType"
      minOccurs="0"/>
    <element name="RH_Position" type="aui:PositionType"
      minOccurs="0"/>
  </sequence>
</complexType>
```

Table 2 shows semantics related to each element of the posture event.

TABLE 2

| Name | Definition |
|---|---|
| User ID (UserID) | This describes the identification (ID) referencing the user. |
| Left hand posture (LH_Posture) | This element describes a posture event of user's left hand. |
| Left hand position (LH_Position) | This element describes a Cartesian position of user's left hand. |
| Right hand posture (RH_Posture) | This element describes a posture event of user's right hand. |
| Right hand position (RH_Position) | This element describes a Cartesian position of user's right hand. |

Elements of the left hand posture and elements of the right hand posture may respectively include open palm, fist, pointing, thumb-up, thumb-down, and grab postures. The elements of the left hand posture and the right hand posture will be described in further detail with reference to FIGS. 3A to 3C.

FIG. 3A illustrates a posture event, according to example embodiments.

Referring to FIG. 3A, out of elements of the posture event, elements of a left hand posture and a right hand posture may include an open palm 311, a first 321, a pointing 331, a thumb-up 341, a thumb-down 351, and a grab 361.

For example, when hand motion information extracted from detection information received from a sensor represents a first state of a hand of a user, the generation unit 230 of the virtual object control apparatus 200 may generate an event including the first 321.

Depending on embodiments, a posture event including the open palm 311 may include a control command 312 for starting or escaping the virtual object or the program. A posture event including the first 321 may include a control command 322 for stopping or selecting the virtual object or the program. A posture event including the pointing 331 may include a control command 332 for pointing to the virtual object or the program. A posture event including the thumb-up 341 may include a control command 342 for executing the virtual object or the program. A posture event including the thumb-down 351 may include a control command 352 for cancelling the virtual object or the program. In addition, a posture event including the grab 361 may include a control command 362 for scrolling the virtual object or the program.

The respective posture events 311 to 361 and the corresponding control commands 312 to 362 may be set directly by the user. That is, the control commands corresponding to the posture events shown in FIG. 3 are merely example embodiments, and thus, are not limiting.

Table 1-2 shows another syntax of the posture event according to example embodiments.

TABLE 1-2

```
<!-- ################################################## -->
<!-- Hand Posture Information                           -->
<!-- ################################################## -->
<complexType name="HandPostureType">
<sequence>
<element name="UserID" type="aui:ID" minOccurs="0"/>
<element name="LH_Posture" type="auict:HandPostureType"/>
<element name="LH_Position" type="aui:PositionType"
minOccurs="0"/>
<element name="RH_Posture" type="auict:HandPosureType"/>
<element name="RH_Position" type="aui:PositionType"
minOccurs="0"/>
</sequence>
<attribute name="LH_PostureConfidence" type="float" use="optional"/>
<attribute name="RH_PostureConfidence" type="float" use="optional"/>
</complexType>
```

Table 2-2 shows semantics related to each element of another posture event.

TABLE 2-2

| Name | Definition |
| --- | --- |
| UserID | This describes the ID referencing the user. |
| LH_Posture | This element describes a posture event of user's left hand. |
| LH_Position | This element describes a Cartesian position of user's left hand. |
| RH_Posture | This element describes a posture event of user's right hand. |
| RH_Position | This element describes a Cartesian position of user's right hand. |
| LH_PostureConfidence | This attribute describes the confidence level of the recognized posture event of user's left hand |
| RH_PostureConfidence | This attribute describes the confidence level of the recognized posture event of user's right hand |

Table 1-3 shows syntax of a posture event, according to other example embodiments.

TABLE 1-3

```
<!-- ################################################## -->
<!-- Hand Posture Information                           -->
<!-- ################################################## -->
<complexType name="HandPostureType">
<sequence>
<element name="Posture" type="aui:HandPostureDataType"
maxOccurs="2"/>
<element name="UserID" type="ID" minOccurs="0"/>
</sequence>
</complexType>
<simpleType name="HandSideType">
<restriction base="string">
<enumeration value="Right"/>
<enumeration value="Left"/>
</restriction>
</simpleType>
<complexType name="HandPostureDataType">
<sequence>
<element name="PostureType" type=" auict:HandPostureType"/>
<element name="HandSide" type="aui:HandSideType"
minOccurs="0"/>
<element name="Position" type="aui:PositionType"
minOccurs="0"/>
<element name="Confidence" type="float" minOccurs="0"/>
</sequence>
</complexType>
```

Table 2-3 shows semantics related to each element of still another posture event.

TABLE 2-3

| Name | Definition |
| --- | --- |
| HandPostureType | This type describes a posture event of user's hand. |
| UserID | This describes the ID referencing the user. |
| Posture | This element describes a posture type of user's hand. |
| HandPostureDataType | This type defines a hand posture. |
| PostureType | This element describes a posture of hand from a posture set enumerated in Hand posture classification process. |
| HandSide | This element describes whether the hand of interest is a left hand or a right hand. |
| Position | This element describes a position of user's hand. |
| Confidence | This attribute describes the confidence level of the recognized posture of the hand |
| HandSideType | This type describes whether the hand of interest is a left hand or a right hand. The value of "Right" describes that the hand is a right hand and the value of "Left" describes that the hand is a left hand. |

According to an aspect, the generation unit 230 may generate the posture event using an input of hand posture information related to a hand posture included in the hand motion information recognized by the processing unit 220. For example, the hand posture information may be the syntax of Table 1-2 and the syntax of Table 1-3. Here, as long as confidence data included in the hand posture information is greater than a preset threshold value, the generation unit 230 may determine the recognized hand posture information as valid data and generate the position event, based on the valid hand posture information.

According to other example embodiments, as long as the confidence data is maintained to be higher than the preset threshold value for a predetermined time, the generation unit 230 may determine the recognized hand posture information as valid data and generate the position event, based on the valid hand posture information.

According to still other example embodiments, as long as the confidence data is maintained to be higher than the preset threshold value for a predetermined time (T) and at a predetermined percentage (x %) or more, the generation unit 230 may determine the recognized hand posture information as valid data and generate the position event based on the valid hand posture information.

The confidence data may be expressed by a percentage value (%) or by a reciprocal of a variance. In addition, the confidence data may verify information capable of measuring accuracy of the hand posture information.

FIG. 3B illustrates flows of state change of the posture event related to the hand posture according to the example embodiments.

Referring to FIG. 3B, a state of the posture event related to the hand posture of the user may be varied between an undetermined posture 371 and a determined posture 372.

Figure 3C:
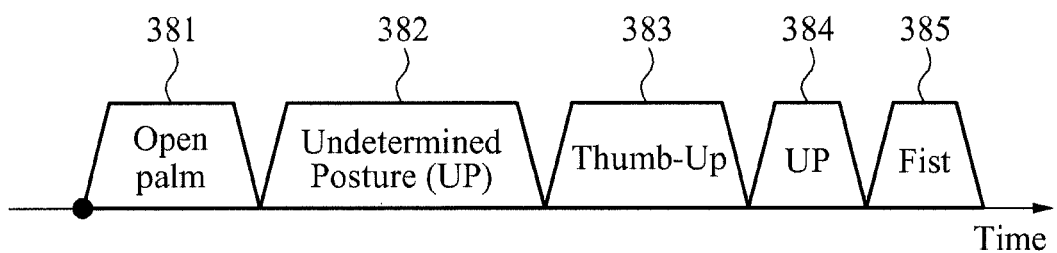
FIG. 3C illustrates flows of state change of a hand posture of a user with time, according to example embodiments.

FIG. 3C illustrates flows of state change of the hand posture of the user with time according to the example embodiments.

Referring to FIG. 3C, the hand posture of the user may change with time. For example, the user may change the hand posture from an open palm 381 to an undetermined posture (UP) 382, next to a thumb-up 383, next to a UP 384 that is a gesture of raising the hand, and then to a first 385.

In this case, the recognized hand posture information may be transmitted every hour or when the hand posture information is changed.

Referring back to FIG. 2, the gesture event may include elements of a user ID, a left hand gesture (LH_Gesture), a left hand start position (LH_StartPosition), a left hand end position (LH_EndPosition), a left hand velocity (LH_Velocity), a left hand acceleration (LH_Acceleration), a right hand gesture (RH_Gesture), a right hand start position (RH_StartPosition), a right hand end position (RH_EndPosition), a right hand velocity (RH_Velocity), and a right hand acceleration (RH_Acceleration).

Table 3 shows syntax of the gesture event, according to example embodiments.

TABLE 3

```
<!-- ################################################## -->
<!-- Hand Gesture Information            -->
<!-- ################################################## -->
<complexType name="HandGestureType">
  <sequence>
    <element name="UserID" type="aui:UserIDType"
      minOccurs="0"/>
    <element name="LH_Gesture" type="auict:HandGestureType"
      minOccurs="0"/>
    <element name="LH_StartPosition" type="aui:PositionType"
      minOccurs="0"/>
    <element name="LH_EndPosition" type="aui:PositionType"
      minOccurs="0"/>
    <element name="LH_Velocity" type="aui:VectorType"
      minOccurs="0"/>
    <element name="LH_Acceleration" type="aui:VectorType"
      minOccurs="0"/>
    <element name="RH_Gesture" type="aui:HandGestureType"
      minOccurs="0"/>
    <element name="RH_StartPosition" type="aui:PositionType"
      minOccurs="0"/>
    <element name="RH_EndPosition" type="aui:PositionType"
      minOccurs="0"/>
    <element name="RH_Velocity" type="aui:VectorType"
      minOccurs="0"/>
    <element name="RH_Acceleration" type="aui:VectorType"
      minOccurs="0"/>
  </sequence>
</complexType>
```

Table 4 shows semantics related to each element of the gesture event.

TABLE 4

| Name | Definition |
|---|---|
| User ID (UserID) | This describes the ID referencing the user. |
| Left hand gesture (LH_Gesture) | This element describes a gesture event of user's left hand. |
| Left hand start point (LH_StartPosition) | This element describes a Cartesian position of user's left hand to represent the starting position of a gesture event. |
| Left hand end point (LH_EndPosition) | This element describes a Cartesian position of user's left hand to represent the ending position of a gesture event. |
| Left hand velocity (LH_Velocity) | This element describes an average velocity vector of a user's left hand to represent a gesture event. |
| Left hand acceleration (LH_Acceleration) | This element describes the maximum acceleration vector of a user's left hand to represent a gesture event. |
| Right hand gesture (RH_Gesture) | This element describes a posture event of user's right hand. |
| Right hand start point (RH_StartPosition) | This element describes a Cartesian position of user's right hand to represent the starting position of a gesture event. |
| Right hand end point (RH_EndPosition) | This element describes a Cartesian position of user's right hand to represent the ending position of a gesture event. |
| Right hand velocity (RH_Velocity) | This element describes an average velocity vector of a user's right hand to represent a gesture event. |
| Right hand accelerartion (RH_Acceleration) | This element describes the maximum acceleration vector of a user's right hand to represent a gesture event. |

Elements of the left hand gesture and elements of the right hand gesture may respectively include a push, a pull, a slap left, a slap right, a slap top, a slap bottom, a circle clockwise, a circle anti-clockwise, a waving and a check. The elements of the left hand gesture and the right hand gesture will be described in detail with reference to FIG. 4.

FIG. 4 illustrates a gesture event according to example embodiments.

Referring to FIG. 4, out of elements of the gesture event according to the example embodiments, elements of a left hand gesture and a right hand gesture may include a push 401, a pull 411, a slap left 421, a slap right 431, a slap top 441, a slap bottom 451, a circle clockwise 461, a circle anti-clockwise 471, a waving 481, and a check 491.

For example, when the hand motion information extracted from detection information received from a sensor represents a gesture of pushing the hand of the user forward, the virtual object control apparatus 200 may generate a gesture event including the push 401.

Depending on embodiments, a gesture event including the push 401 may include a control command 402 for zooming-in or selecting the virtual object or the program. A gesture event including the pull 411 may include a control command 412 for zooming-out or escaping the virtual object or the program. A gesture event including the slap left 421 may include a control command 422 for scrolling the virtual object or the program horizontally from the right to the left. A gesture event including the slap right 431 may include a control command 432 for scrolling the virtual object or the program horizontally from the left to the right. A gesture event including the slap top 441 may include a control command 442 for scrolling the virtual object or the program vertically from a bottom to a top. A gesture event including the slap bottom 451 may include a control command 452 for scrolling the virtual object or the program vertically from a top to a bottom. A gesture event including the circle clockwise 461 may include a control command 462 for increasing the virtual object or the program. A gesture event including the circle anti-clockwise 471 may include a control command 472 for decreasing the virtual object or the program. A gesture event including the waving 481 may include a control command 482 for waking up the virtual object or the program or for executing a context menu. In addition, a gesture event including the check 491 may include a control command 492 for permitting the virtual object or the program.

The respective gesture events 401 to 491 and the corresponding control commands 402 to 492 may be set directly by the user. That is, the control commands corresponding to the gesture events shown in FIG. 4 are merely example embodiments.

Table 3-2 shows syntax of a gesture event, according to other example embodiments.

TABLE 3-2

```
<!-- ################################################## -->
<!-- Hand Gesture Information            -->
<!-- ################################################## -->
<complexType name="HandGestureType">
<sequence>
```

TABLE 3-2-continued

```
<element name="UserID" type="aui:UserIDType" minOccurs="0"/>
<element name="LH_Gesture" type="auict:HandGestureType"
minOccurs="0"/>
<element name="LH_StartPosition" type="aui:PositionType"
minOccurs="0"/>
<element name="LH_EndPosition" type="aui:PositionType"
minOccurs="0"/>
<element name="LH_Velocity" type="aui:VectorType"
minOccurs="0"/>
<element name="LH_Acceleration" type="aui:VectorType"
minOccurs="0"/>
<element name="RH_Gesture" type="aui:HandGestureType"
minOccurs="0"/>
<element name="RH_StartPosition" type="aui:PositionType"
minOccurs="0"/>
<element name="RH_EndPosition" type="aui:PositionType"
minOccurs="0"/>
<element name="RH_Velocity" type="aui:VectorType"
minOccurs="0"/>
<element name="RH_Acceleration" type="aui:VectorType"
minOccurs="0"/>
</sequence>
<attribute name="LH_GestureConfidence" type="float"
use="optional"/>
<attribute name="RH_GestureConfidence" type="float"
use="optional"/>
</complexType>
```

Table 4-2 shows semantics related to each element of another gesture event.

TABLE 4-2

| Name | Definition |
| --- | --- |
| UserID | This describes the ID referencing the user. |
| LH_Gesture | This element describes a gesture event of user's left hand. |
| LH_StartPosition | This element describes a Cartesian position of user's left hand to represent the starting position of a gesture event. |
| LH_EndPosition | This element describes a Cartesian position of user's left hand to represent the ending position of a gesture event. |
| LH_Velocity | This element describes an average velocity vector of a user's left hand to represent a gesture event. |
| LH_Acceleration | This element describes the maximum acceleration vector of a user's left hand to represent a gesture event. |
| RH_Posture | This element describes a posture event of user's right hand. |
| RH_StartPosition | This element describes a Cartesian position of user's right hand to represent the starting position of a gesture event. |
| RH_EndPosition | This element describes a Cartesian position of user's right hand to represent the ending position of a gesture event. |
| RH_Velocity | This element describes an average velocity vector of a user's right hand to represent a gesture event. |
| RH_Acceleration | This element describes the maximum acceleration vector of a user's right hand to represent a gesture event. |
| LH_GestureConfidence | This attribute describes the confidence level of the recognized gesture event of user's left hand |
| RH_GestureConfidence | This attribute describes the confidence level of the recognized gesture event of user's right hand |

Table 3-3 shows syntax of a gesture event, according to other example embodiments.

TABLE 3-3

```
<!-- ################################################ -->
<!--         Hand Gesture Information           -->
<!-- ################################################ -->
<complexType name="HandGestureType">
  <sequence>
    <element name="Gesture" type="aui:HandGestureDataType"
      maxOccurs="unbounded"/>
    <element name="UserID" type="ID" minOccurs="0"/>
  </sequence>
</complexType>
<complexType name="HandGestureDataType">
  <sequence>
    <element name="GestureType" type=" auict:HandGestureType "/>
    <element name="HandSide" type=" aui:HandSideType"
    minOccurs="0"/>
    <element name="StartPosition" type=" aui:PositionType"
    minOccurs="0"/>
    <element name="EndPosition" type=" aui:PositionType"
    minOccurs="0"/>
    <element name="Velocity" type=" aui:VelocityValueType"
    minOccurs="0"/>
    <element name="Acceleration" type="aui: AccelerationValueType"
    minOccurs="0"/>
    <element name="Confidence" type="float" minOccurs="0"/>
  </sequence>
</complexType>
```

Table 4-3 shows semantics related to each element of another gesture event.

TABLE 4-3

| Name | Definition |
| --- | --- |
| UserID | This describes the ID referencing the user. |
| Gesture | This element describes a gesture event of user's hand. |
| HandGestureDataType | This type describes a gesture event of user's hand. |
| GestureType | This element describes a gesture of user's hand from a gesture set enumerated in Hand gesture classification process. |
| HandSide | This element describes whether the hand of interest is a left hand or a right hand. |
| StartPosition | This element describes a start position of user's hand gesture. |
| EndPosition | This element describes an end position of user's hand gesture. |
| Velocity | This element describes an average velocity vector of a user's hand to represent a gesture event. |
| Acceleration | This element describes the maximum acceleration vector of a user's hand to represent a gesture event. |
| Confidence | This attribute describes the confidence level of the recognized gesture of the hand |

According to an aspect, the generation unit 230 may generate the gesture event using an input of hand gesture information related to a hand gesture included in the hand motion information recognized by the processing unit 220. For example, the hand gesture information may be the syntax of Table 3-2 and the syntax of Table 3-3. Here, as long as confidence data included in the hand gesture information is greater than a preset threshold value, the generation unit 230 may determine the recognized hand gesture information as valid data and generate the gesture event, based on the valid hand gesture information.

According to other example embodiments, as long as the confidence data is higher than the preset threshold value, in particular, as long as a velocity value is greater than a threshold velocity value, the generation unit 230 may determine the recognized hand gesture information as valid data and generate the gesture event, based on the valid hand gesture information.

According to other example embodiments, as long as the confidence data is higher than the preset threshold value, in particular, as long as an acceleration value is greater than a threshold acceleration value, the generation unit 230 may determine the recognized hand posture information as valid data and generate the gesture event, based on the valid hand gesture information.

According to further example embodiments, as long as the confidence data is higher than the preset threshold value, in particular, as long as a peak acceleration is greater than the threshold acceleration value and an average velocity is greater than the threshold velocity value, the generation unit 230 may determine the recognized hand posture information as valid data and generate the gesture event, based on the valid hand gesture information.

According to example embodiments, the confidence data may be expressed by a percentage value or by a reciprocal of a variance. In addition, the confidence data may verify information capable of measuring accuracy of the hand posture information.

Figure 5:
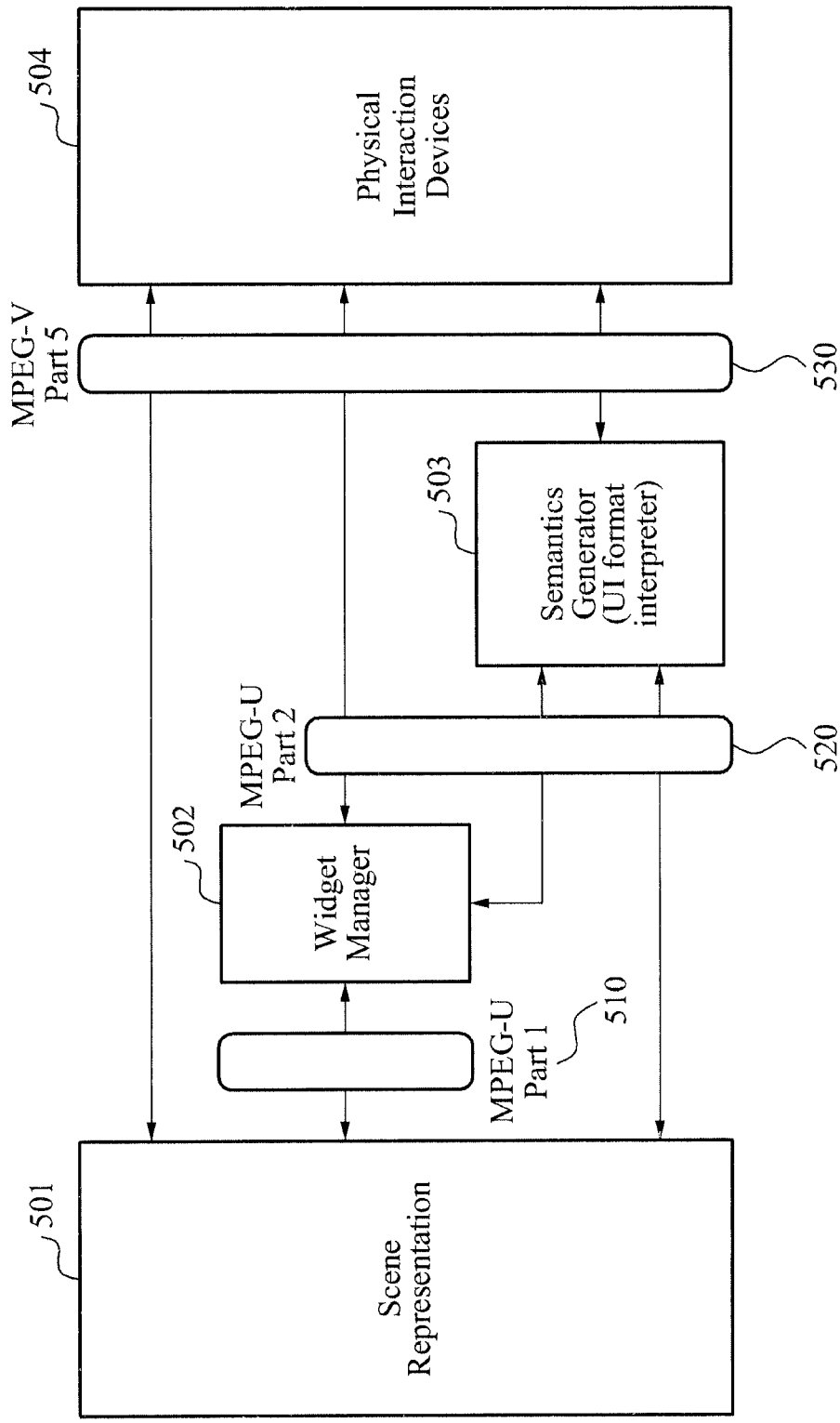
FIG. 5 illustrates an overall system applying a virtual object control apparatus, according to example embodiments.

FIG. 5 illustrates an overall system applying a virtual object control apparatus, according to example embodiments.

Referring to FIG. 5, an interaction between physical interaction devices 504 denoting a real world and a scene representation 501 denoting a virtual world, that is, a virtual object is illustrated.

The scene representation may be an example of the virtual object. The scene representation may include BIFS, LASeR, and Widget. The BIFS refers to a scene standard with respect to all multimedia contents. The LASeR refers to a scene standard with respect to multimedia contents, using a small display and a small network bandwidth, such as, a mobile phone.

An area 510 refers to a compatible interaction area between a Widget manager 502 and the scene representation 501. Moving picture expert group (MPEG)-U Part 1 may be applied to the area 510. MPEG-U Part 1 refers to a standard technology enabling compatible interaction among Widget formats of CE terminals, such as, an internet protocol television (IPTV) and a mobile phone.

An area 520 refers to a compatible interaction area between a semantics generator 503 and the scene representation 501, between the Widget manager 502 and the semantics generator 503, and between the Widget manager 502 and the physical interaction devices 504. MPEG-U Part 2 may be applied to the area 520. MPEG-U Part 2 refers to a standard technology connecting a scene representation engine, such as, the BIFS and the LASeR with a sensor/actuator for interaction with rich media in a CE device.

An area 530 refers to a compatible interaction area between the scene representation 501 and the physical interaction devices 504, between the Widget manager 502 and the physical interaction devices 504, and between the semantics generator 503 and the physical interaction devices 504. MPEG-V Part 5 may be applied to the area 530. MPEG-V is a 3D interface standard for exchange of interface information on 3D MR, 3D Internet, and interactive games. MPEG-V Part 5 described detection information of the sensor/actuator.

Depending on embodiments, the virtual object control apparatus described with reference to FIGS. 1 to 4 may be applied to the area 520.

Figure 6:
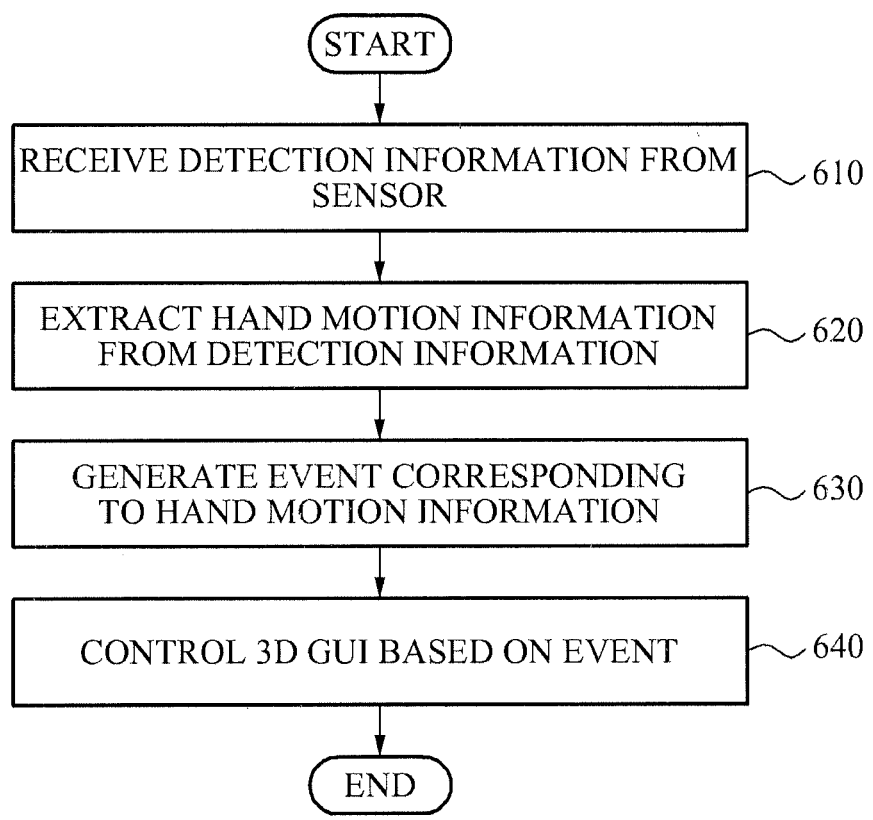
FIG. 6 illustrates a virtual object control method, according to example embodiments.

FIG. 6 illustrates a virtual object control method, according to example embodiments.

Referring to FIG. 6, the virtual object control method receives detection information related to a user from a sensor in operation 610.

The sensor may be a motion sensor, a camera, and the like.

In operation 620, the virtual object control method may extract hand motion information related to a hand motion of the user from the received detection information. Specifically, the virtual object control method may recognize a posture or a gesture of the hand of the user using the detection information, and extract the hand motion information related to the hand motion of the user from the detection information.

In operation 630, the virtual object control method may generate an event corresponding to the extracted hand motion information.

In operation 640, the virtual object control method may control the virtual object displayed on a 3D GUI, based on the generated event.

The virtual object may be described by at least one scene representation selected from BIFS, LASeR, and Widget.

According to an aspect, the virtual object control method may further include outputting the virtual object to a display device.

The event may include a posture event related to a hand posture of the user and a gesture event related to a hand gesture of the user. That is, the virtual object control method may distinguish the hand posture and the hand gesture from each other in accordance with the hand motion information, and thereby generate the posture event or the gesture event.

The posture event may include elements of a user ID, a left hand posture (LH_Posture), a left hand position (LH_Position), a right hand posture (RH_Posture), and a right hand position (RH_Position).

Elements of the left hand posture and elements of the right hand posture may respectively include an open palm, a fist, a pointing, a thumb-up, a thumb-down, and a grab.

The gesture event may include elements of a user ID, a left hand gesture (LH_Gesture), a left hand start position (LH_StartPosition), a left hand end position (LH_EndPosition), a left hand velocity (LH_Velocity), a left hand acceleration (LH_Acceleration), a right hand gesture (RH_Gesture), a right hand start position (RH_StartPosition), a right hand end position (RH_EndPosition), a right hand velocity (RH_Velocity), and a right hand acceleration (RH_Acceleration).

Elements of the left hand gesture and the right hand gesture may respectively include a push, a pull, a slap left, a slap right, a slap top, a slap bottom, a circle clockwise, a circle anti-clockwise, a waving, and a check.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, the virtual object control apparatus 200, as shown in FIG. 2, for example, may include at least one processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A virtual object control apparatus, the apparatus comprising: a processor configured to: receive detection information related to a user from a sensor; extract hand motion information related to hand motions of the user from the received detection information; determine whether the extracted hand motion information is valid based on confidence data; being expressed by a reciprocal of a variance of the extracted hand motion an average velocity of the extracted hand motion and a peak acceleration of the extracted hand motion; generate at least one of a posture event and a gesture event according to the extracted hand motion information, in response to the determination that the extracted hand motion information is valid; and output the generated event, wherein a virtual object displayed on a 3-dimensional graphic user interface (3D GUI) is controlled based on the generated event, wherein the processor is further configured to determine that the extracted hand motion information is valid if the confidence data is higher than a preset threshold value, the peak acceleration is greater than a threshold acceleration value, and the average velocity is greater than a threshold velocity value, wherein the virtual object is described by at least one scene representation method selected from binary formats for scenes (BIFS), light application scene representation (LASeR), and Widget.

2. The virtual object control apparatus of claim 1, wherein the event comprises the posture event related to a posture of a hand of the user and the gesture event related to a gesture of the hand.

3. The virtual object control apparatus of claim 1, wherein the posture event further comprises attributes of left hand confidence and right hand confidence.

4. The virtual object control apparatus of claim 1, wherein the gesture event further comprises elements of a left hand gesture confidence and a right hand gesture confidence.

5. A virtual object control method, the method comprising: receiving, by a processor, detection information related to motions of a user from a sensor; extracting hand motion information related to hand motions of the user from the received detection information; determining whether the extracted hand motion information is valid based on confidence data, an average velocity of the extracted hand motion and a peak acceleration of the extracted hand motion; generating at least one of a posture event and a gesture event according to the extracted hand motion information, in response to the determination that the extracted hand motion information is valid; and transmitting, to a scene representation engine, the generated event, wherein the scene representation engine controls a virtual object displayed on a 3-dimensional graphic user interface (3D GUI) based on the generated event, wherein the processor is further configured to determine that the extracted hand motion information is valid if the confidence data is higher than a preset threshold value, the peak acceleration is greater than a threshold acceleration value, and the average velocity is greater than a threshold velocity value, wherein the virtual object is described by at least one scene representation method selected from binary formats for scenes (BIFS), light application scene representation (LASeR), and Widget.

6. A non-transitory computer readable recording medium storing a program to cause a computer to implement the method of claim 5.

7. The virtual object control apparatus of claim 1, wherein the processor is further configured to determine recognized hand posture information as valid data and generates the posture event, as long as the confidence data is maintained higher than the preset threshold value for a predetermined time.

8. The virtual object control apparatus of claim 1, wherein the processor is further configured to determine recognized hand posture information and generates the posture event, as long as the confidence data is maintained higher than the preset threshold value for a predetermined time and at a predetermined percentage or more.

9. The virtual object control apparatus of claim 1, wherein the processor is further configured to determine recognized hand gesture information as valid data and generates the gesture event, as long as the confidence data is maintained higher than the preset threshold value.

10. The virtual object control apparatus of claim 1, wherein the processor is further configured to determine whether a state of the at least one of the posture event and the gesture event is changed, and to output the at least one of the posture event and the gesture event in response to the determination that the state is changed.

11. The virtual object control apparatus of claim 1, wherein the posture event includes a posture element describing a posture of user's hand from a posture set enumerated in a hand posture classification scheme, a hand type element describing whether the hand of interest is a left hand or a right hand, and a position element describing a position of the user's hand, wherein the hand posture classification scheme defines an enumeration sequence for the posture set comprising an open palm, a fist, a pointing, a thumb-up, a thumb-down, and a grab.

12. The virtual object control apparatus of claim 1, wherein the gesture event includes a gesture element describing a gesture of the user's hand from a gesture set enumerated in a hand gesture classification scheme, and a hand type element describing whether the hand of interest is a left hand or a right hand, wherein the hand gesture classification scheme defines an enumeration sequence for the gesture set comprising a push, a pull, a slap left, a slap right, a slap top, a slap bottom, a circle clockwise, a circle anti-clockwise, a waving, and a check.

13. The virtual object control apparatus of claim 1, wherein the processor is further configured to:
transmit, to a scene representation engine, the generated event, wherein the scene representation engine controls a virtual object displayed on a 3-dimensional graphic user interface (3D GUI) based on the generated event, and transmit, to an actuator, a signal connecting the scene representation engine and the actuator, wherein the actuator interacts with rich media in a device of the user based on the signal.

14. The virtual object control apparatus of claim 1, wherein, when the hand motion information comprises hand posture information, the processor is further configured to determine whether the hand posture information is valid based on the confidence data, and wherein, when the hand motion information comprises hand gesture information, the processor is further configured to determine whether the hand gesture information is valid based on the confidence data, the velocity value and the acceleration value.

15. The virtual object control method of claim 5, wherein the confidence data being expressed by a reciprocal of a variance of the extracted hand motion.

16. The virtual object control method of claim 5, wherein, when the hand motion information comprises hand posture information, the determining comprises determining whether the hand posture information is valid based on the confidence data, and wherein, when the hand motion information comprises hand gesture information, the determining comprises determining whether the hand gesture information is valid based on the confidence data, the velocity value and the acceleration value.

* * * * *